(12) United States Patent
Watanabe et al.

(10) Patent No.: US 12,169,441 B2
(45) Date of Patent: Dec. 17, 2024

(54) DATA MANAGEMENT SYSTEM AND DATA MANAGEMENT METHOD

(71) Applicant: Hitachi, Ltd., Tokyo (JP)

(72) Inventors: Soichi Watanabe, Tokyo (JP); Miho Kobayashi, Tokyo (JP); Mitsuo Hayasaka, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 18/464,398

(22) Filed: Sep. 11, 2023

(65) Prior Publication Data

US 2024/0241794 A1 Jul. 18, 2024

(30) Foreign Application Priority Data

Jan. 12, 2023 (JP) .................. 2023-003292

(51) Int. Cl.
*G06F 11/14* (2006.01)
(52) U.S. Cl.
CPC ...... *G06F 11/1464* (2013.01); *G06F 11/1469* (2013.01); *G06F 2201/84* (2013.01)
(58) Field of Classification Search
CPC .............. G06F 11/1464; G06F 11/1469
See application file for complete search history.

(56) References Cited

U.S. PATENT DOCUMENTS

| | | | |
|---|---|---|---|
| 10,127,117 B2 | 11/2018 | Binford et al. | |
| 10,255,136 B2* | 4/2019 | Salapura | H04L 67/10 |
| 10,268,551 B1* | 4/2019 | Wong | G06F 11/1464 |
| 2009/0164530 A1* | 6/2009 | Gilpin | G06F 11/1464 |
| 2014/0181021 A1* | 6/2014 | Montulli | G06F 16/285 |
| | | | 707/624 |
| 2015/0134899 A1* | 5/2015 | Cudak | G06F 3/0605 |
| | | | 711/112 |
| 2018/0121295 A1* | 5/2018 | Ramamurthi | G06F 11/3024 |
| 2021/0216410 A1* | 7/2021 | Jin | G06F 3/061 |
| 2022/0138051 A1* | 5/2022 | Yelheri | G06F 11/1469 |
| | | | 711/162 |
| 2022/0222207 A1 | 7/2022 | Kaneko | |
| 2022/0237089 A1* | 7/2022 | Zhang | G06F 11/1484 |
| 2022/0391097 A1* | 12/2022 | Rath | G06F 11/1461 |
| 2023/0297479 A1* | 9/2023 | Huang | G06F 11/1469 |
| | | | 707/654 |
| 2023/0315586 A1* | 10/2023 | Desai | G06F 11/3409 |
| | | | 711/162 |

FOREIGN PATENT DOCUMENTS

JP 2022-108398 A 7/2022

* cited by examiner

*Primary Examiner* — Huawen A Peng
(74) *Attorney, Agent, or Firm* — Volpe Koenig

(57) ABSTRACT

A data management system for backing up data in a first environment to a second environment includes: backup management information in which source data, backup data, a backup method, and data backed up using the backup method are associated; and a secondary usage data copy unit serving as a secondary usage processing unit that receives a usage request for the backup data stored in the second environment, wherein the secondary usage processing unit refers to the backup management information, specifies the backup data required for processing the usage request, specifies the backup method for the backup data, restores the backup data on the basis of the specified backup method, and enables processing of the usage request.

6 Claims, 13 Drawing Sheets

FIG. 5

| DB table | DB ID | Volume ID | Storage ID |
|---|---|---|---|
| Table_A | DB_1 | Volume#0 | Storage_1 |
| Table_B | DB_1 | Volume#0 | Storage_1 |
| Table_C | DB_2 | Volume#1 | Storage_1 |
| Table_D | DB_3 | Volume#2 | Storage_2 |
| ... | | | |

FIG. 6

| Volume ID | Backup ID | Volume size | Storage ID |
|---|---|---|---|
| Volume#0 | N/A | 100GB | Storage_1 |
| Volume#1 | Bucket://x | 1TB | Storage_1 |
| Volume#2 | Bucket://y, Bucket://z | 1TB | Storage_1 |
| Volume#3 | Volume#4 | 500GB | Storage_2 |
| ... | | | |

FIG. 7

| Backup ID 701 | BACKUP METHOD 702 | Source Volume ID 703 | Source Storage ID 704 | LAST UPDATE DATE AND TIME 705 |
|---|---|---|---|---|
| Bucket://x | TO OBJECT USING STORAGE FUNCTION | Volume#1 | Storage_1 | Timestamp aa |
| Bucket://y | BACKUP SOFTWARE | Volume#2 | Storage_1 | Timestamp bb |
| Bucket://z | TO OBJECT USING STORAGE FUNCTION | Volume#0 | Storage_1 | N/A |
| Volume#4 | COPY TO Volume USING STORAGE-FUNCTION | Volume#0 | Storage_1 | Timestamp dd |
| Volume#4 | COPY TO Volume USING STORAGE-FUNCTION | Volume#0 | Storage_2 | Timestamp dd |
| ... | | | | ... |

FIG. 10

| | TABLE NAME | DB NAME | STORAGE ID | DATA LOCATION | LAST UPDATE DATE AND TIME |
|---|---|---|---|---|---|
| ☐ | TableA | DB1 | Storage_1 | onprem.siteX | yyyy-mm-dd |
| ☐ | TableA | DB1 | Storage_1 | cloud.Y Volume#4 | yyyy-mm-dd |
| ✓ | TableA | DB1 | Storage_1 | Bucket://Z | yyyy-mm-dd |
| ☐ | TableA | DB1 | ... | ... | ... |
| | ... | ... | ... | ... | ... |

SEARCH: DB1

CONFIRM

DATA MANAGEMENT SYSTEM AND DATA MANAGEMENT METHOD

BACKGROUND OF THE INVENTION

1. Field of the Invention

The present invention relates to a data management system and a data management method.

2. Description of the Related Art

In recent years, hybrid cloud and multi-cloud data management, which combine on-premises with private cloud or public cloud data management and the like, have become widespread. For example, U.S. Pat. No. 10,127,117 B2 discloses a technology for backing up a volume stored in on-premises block storage to low-cost public cloud object storage.

In addition, there are cases where there is a desire to analyze data, which has been generated on premises, on a public cloud computing infrastructure. As described above, using data which has been generated in a certain environment and backed up in another environment, at the backup destination, is referred to as the secondary usage of data. In a case where data has been backed up to the cloud by using technology like that in U.S. Pat. No. 10,127,117 B2, by duplicating the data from the cloud backup to the computing infrastructure, it is considered possible to quickly utilize the data without network communication occurring between on-premises and the cloud.

In order to secondarily use the data generated by the system across a plurality of sites as described above, it is necessary to ascertain at which site the data is generated, as well as where, and by what method the data is managed. JP 2022-108398 A discloses a technology for quickly ascertaining the data usage status of a storage device in a hybrid cloud configuration.

SUMMARY OF THE INVENTION

In the technology disclosed in JP 2022-108398 A, the relationship between the storage volume and the site where the backup of the storage volume is stored can be tracked, but the details of the method of acquiring the backup are not known. When the backup method is different, the processing to restore a backup to a cloud analysis infrastructure is also different, and thus, in JP 2022-108398 A, the processing to restore the backup to the cloud analysis infrastructure cannot be specified. Therefore, in a configuration in which on-premises data is backed up to the cloud by using a plurality of backup methods, data secondary usage cannot be realized.

In order to solve the above problems, one representative example of a data management system of the present invention is a data management system for backing up data in a first environment to a second environment, the data management system including: backup management information in which source data, backup data, and a backup method are associated; and a secondary usage processing unit that receives a usage request for the backup data stored in the second environment, wherein the secondary usage processing unit refers to the backup management information, specifies backup data required for processing the usage request, specifies a backup method for the backup data, restores the backup data on the basis of the specified backup method, and enables processing of the usage request.

In addition, one representative data management method of the present invention is characterized by including steps in which a data management system for backing up data in a first environment to a second environment: generates backup management information by associating source data, backup data, and a backup method; receives a usage request for the backup data stored in the second environment; and specifies backup data required for processing the usage request by referring to the backup management information, specifies a backup method for the backup data, restores the backup data on the basis of the specified backup method, and enables processing of the usage request.

With the present invention, secondary usage of data in which backups are utilized effectively can be realized.

BRIEF DESCRIPTION OF THE DRAWINGS

FIG. 5 is a diagram illustrating DB table-block volume mapping information according to the first embodiment;

FIG. 6 is a diagram illustrating volume management information according to the first embodiment;

FIG. 7 is a diagram illustrating backup management information according to the first embodiment;

FIG. 10 is a diagram illustrating an example of a secondary usage catalog selection screen according to the first embodiment;

DESCRIPTION OF THE PREFERRED EMBODIMENTS

Hereinafter, an embodiment of the present invention will be described with reference to the drawings.

First Embodiment

Figure 1:
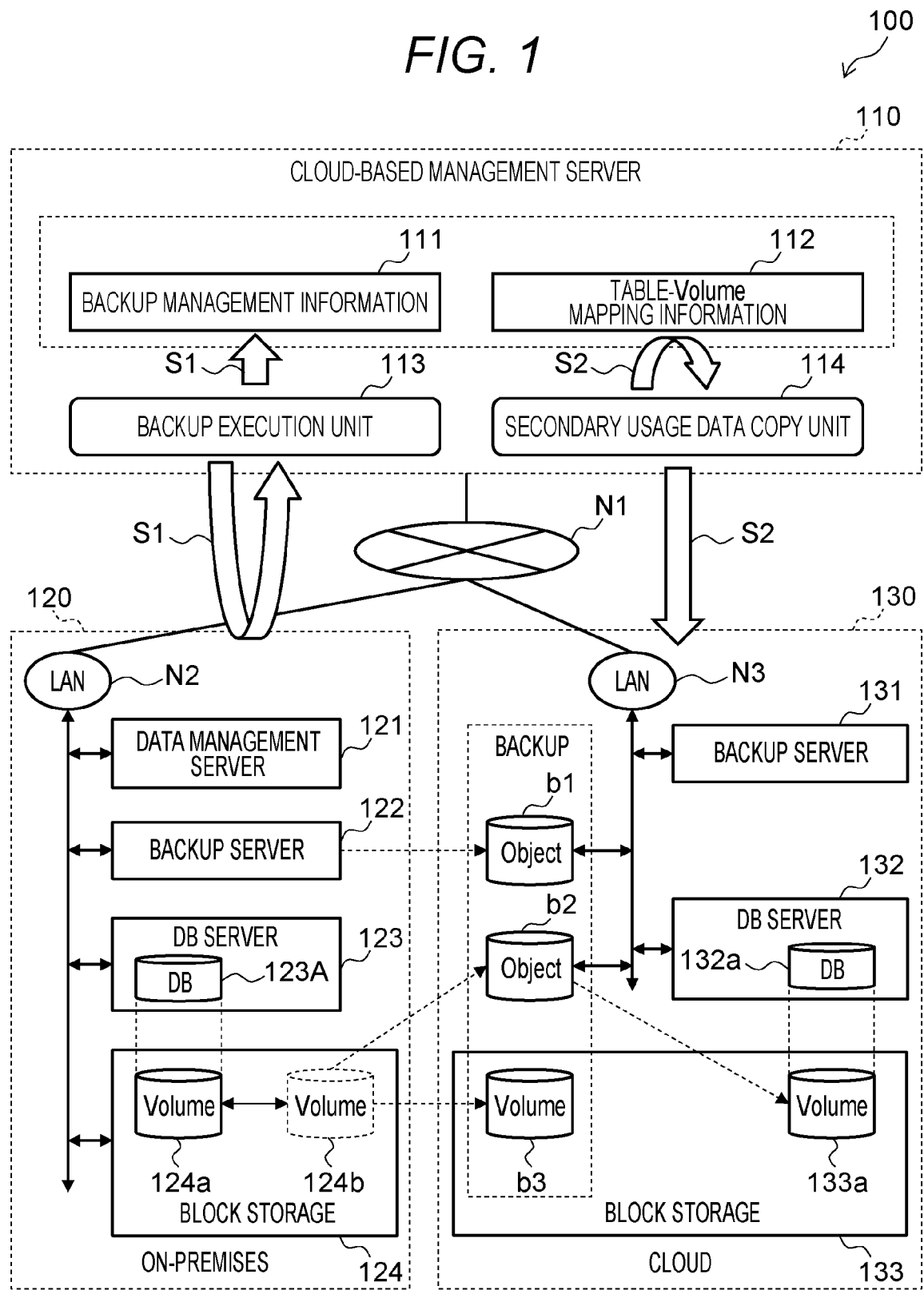
FIG. 1 is a diagram illustrating an outline of a configuration and processing of a computer system according to a first embodiment.

FIG. 1 is a diagram illustrating an outline of a configuration and processing of a computer system 100 according to a first embodiment. The computer system 100 illustrated in FIG. 1 includes a cloud-based management server 110, an on-premises environment 120 (first site), and a cloud environment 130 (second site). The cloud-based management server 110, the on-premises environment 120, and the cloud environment 130 are communicably connected by, for example, a network N1.

The cloud-based management server 110 includes backup management information 111, table-volume mapping information 112, a backup execution unit 113, and a secondary usage data copy unit 114. Note that the cloud-based management server 110 also includes constituent elements other than the foregoing, and all of the constituent elements will be described below with reference FIG. 4.

The on-premises environment 120 includes a data management server 121, a backup server 122, a DB server 123, and block storage 124. The data management server 121, the backup server 122, the DB server 123, and the block storage 124 are communicably connected to each other via a network such as a LAN (Local Area Network N2 in the on-premises environment 120, for example. The DB server 123 stores the data of a DB 123a in a block volume 124a provided by the block storage 124, for example.

The cloud environment 130 includes a backup server 131, a DB server 132, and block storage 133. The backup server 131, the DB server 132, and the block storage 133 are communicably connected to each other via a network such as a LAN N3 in the cloud environment 130, for example. The DB 132a of the DB server 132 is, for example, connected to a block volume 133a provided by the block storage 133, and the data is made available.

FIG. 1 illustrates steps S1 and S2 as a processing procedure outlining the overall processing according to the first embodiment.

In step S1, the backup execution unit 113 transfers a backup of data of the on-premises environment 120 to the cloud environment 130 according to user input information. When the backup processing is complete, the backup execution unit stores the backup information in the backup management information 111. In step S1, for example, the volume 124a is stored as a plurality of backups (a backup b1, a backup b2, and a backup b3) in the cloud environment 130 by using a plurality of backup methods. For example, the backup server 122 is capable of acquiring the backup b1 to the object storage of the cloud environment 130 for the data of the DB 123a and the volume 124a. Furthermore, by using the backup function, the block storage 124 is capable of acquiring a backup of a snapshot 124b of the volume 124a as the backup b2 to the object storage in the cloud environment 130. In addition, by using the remote copy function, the block storage 124 is capable of acquiring the backup b3 by copying the snapshot 124b of the volume 124a to the block volume of the block storage 133 in the cloud environment 130.

In step S2, the secondary usage data copy unit 114 restores a backup (one backup from among the backup b1, the backup b2, and the backup b3) of the cloud environment 130 to the DB 132a or the volume 133a according to user input information.

Figure 2:
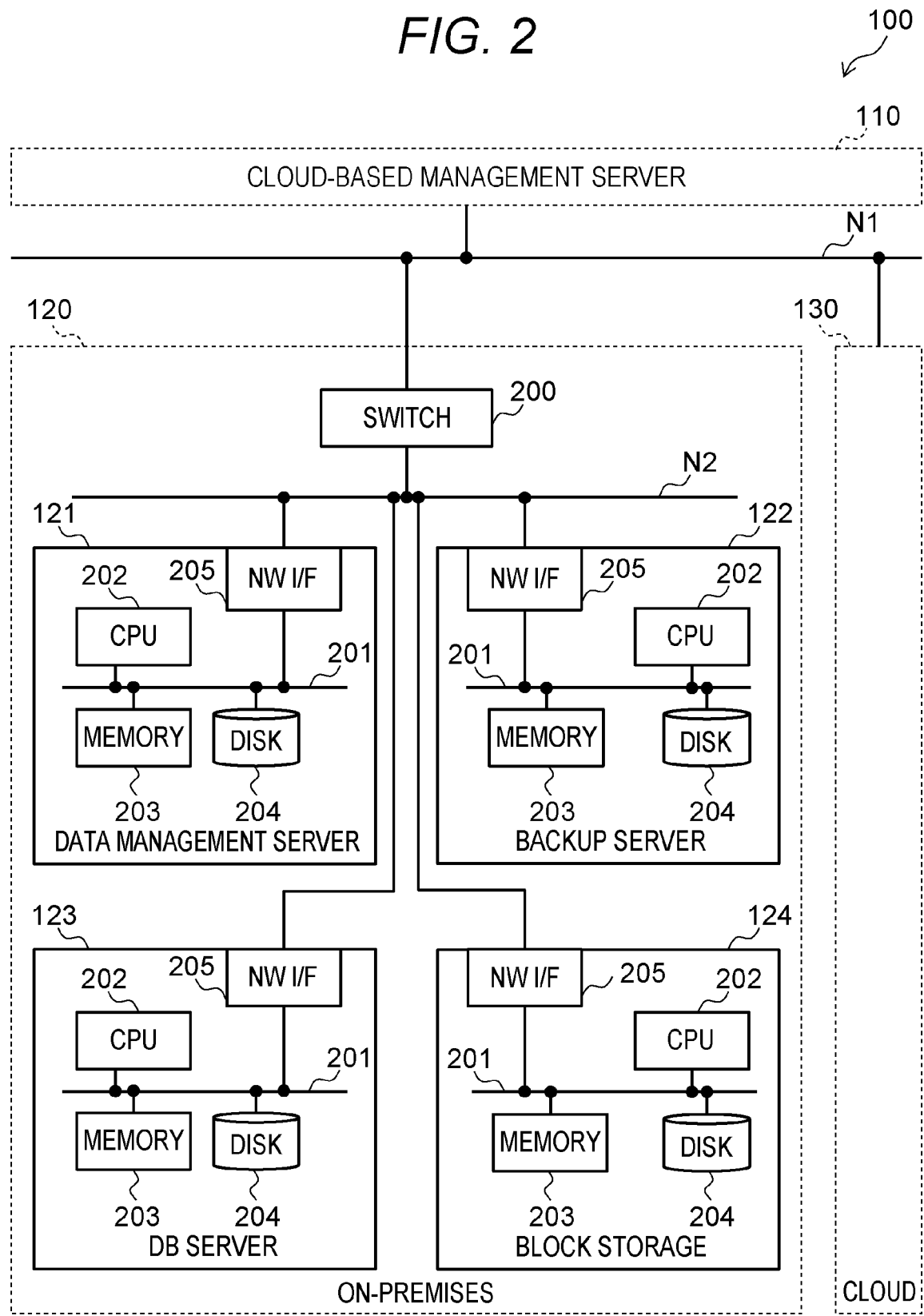
FIG. 2 is a diagram illustrating a hardware configuration according to the first embodiment.

FIG. 2 is a diagram illustrating a hardware configuration example of the computer system 100 according to the first embodiment.

The on-premises environment 120 comprises a switch 200 for connecting a network N2 within the on-premises environment 120 to the network N1 outside the on-premises environment 120. Note that the switch 200 is not necessarily required, and the network N2 in the on-premises environment 120 and the network N1 outside the on-premises environment 120 may be the same network. In addition, these networks N1 and N2 may have a redundant configuration. Furthermore, these networks N1 and N2 may be any communication means such as Ethernet (registered trademark), InfiniBand, or wireless communication. In addition, in FIG. 2, there is a fixed number of the data management server 121, the backup server 122, the DB server 123, and the block storage 124. However, in the first embodiment, the number of the data management server 121, the backup server 122, the DB server 123, and the block storage 124 is not necessarily fixed, and may be one or more.

The data management server 121 includes a CPU 202, which serves as an example of a processor, a memory 203 serving as a main storage device, a disk device 204 serving as a secondary storage device, and one or more of an NW/IF 205. The CPU 202, the memory 203, the disk device 204, and the NW/IF 205 are connected via a bus 201.

The CPU 202 executes various processing by reading programs stored on the disk device 204 into the memory 203 and executing the programs. The CPU 202 transmits and receives data to and from other devices (the backup server 122, DB server 123, and block storage 124) connected by the network N2 via the bus 201 and the NW/IF 205.

The backup server 122 includes the CPU 202, the memory 203, the disk device 204, and the NW/IF 205. The CPU 202, the memory 203, the disk device 204, and the NW/IF 205 are connected via a bus 201.

The DB server 123 includes the CPU 202, the memory 203, the disk device 204, and the NW/IF 205. The CPU 202, the memory 203, the disk device 204, and the NW/IF 205 are connected via a bus 201.

The block storage 124 includes the CPU 202, the memory 203, the disk device 204, and the NW/IF 205. The CPU 202, the memory 203, the disk device 204, and the NW/IF 205 are connected via a bus 201.

Figure 3:
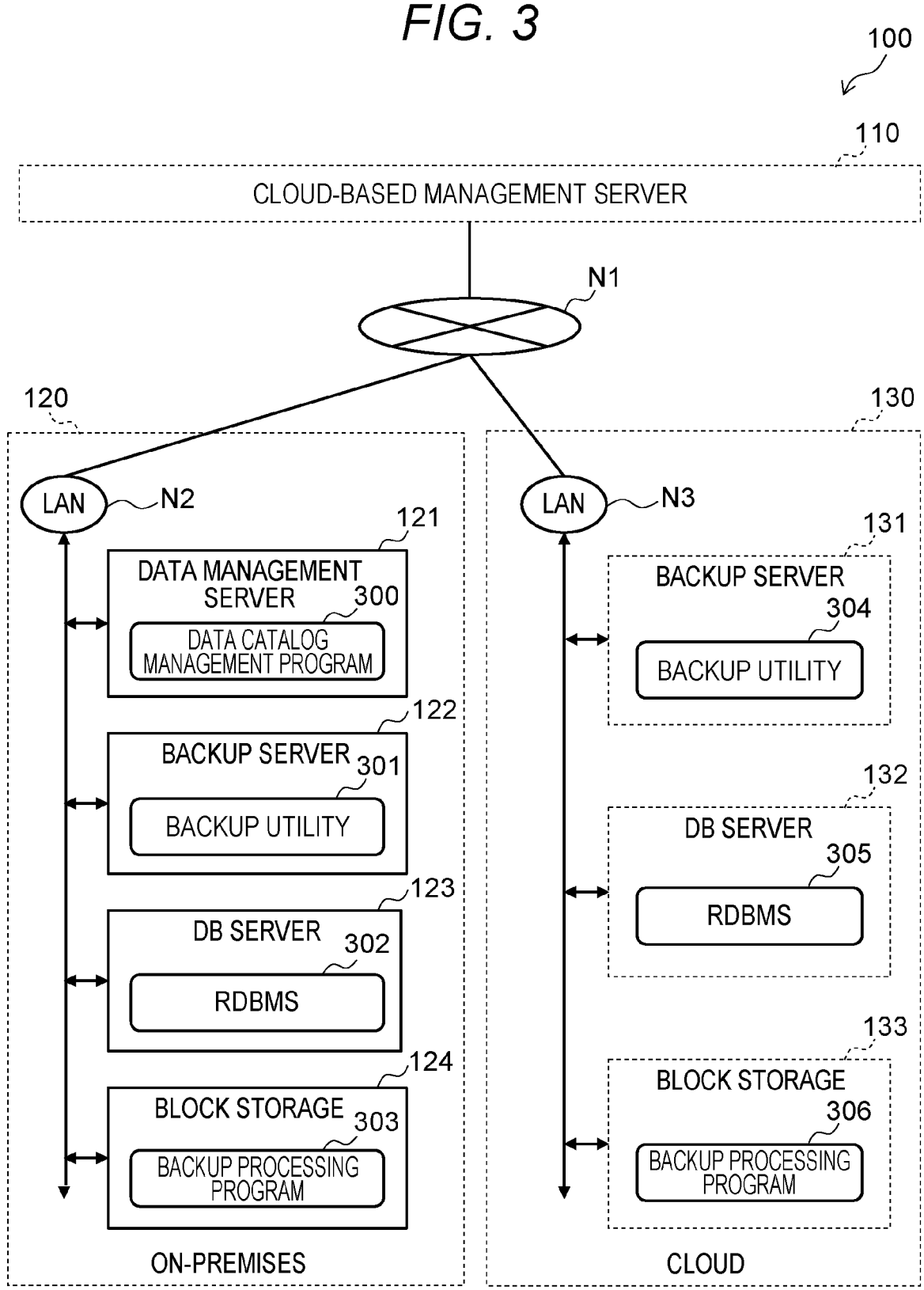
FIG. 3 is a diagram illustrating a logical configuration according to the first embodiment.

FIG. 3 is a logical configuration diagram of the computer system 100 according to the first embodiment.

The data management server 121 stores a data management program 300. When executed by the CPU 202 of the data management server 121, the data management program 300 receives and manages the catalog information of the DB server.

The backup server 122 stores a backup utility 301. When executed by the CPU 202 of the backup server 122, the backup utility 301 backs up, for example, the DB 123a of the DB server 123 and the block volume 124a of the block storage 124 in which the data of the DB 123a is stored, to the object storage of the cloud environment 130. In the following description, the backup server 122 and the backup utility 301 are of one type, but there may be two or more different types of backup servers and backup utilities. In this case, the corresponding backup server and the backup utility also need to be prepared in the cloud environment 130.

The DB server 123 stores an RDBMS (Relational Database Management System) 302. When the RDBMS 302 is executed by the CPU 202 of the DB server 123, for example, an IO of data is issued to the DB 123a, and as a result, an IO operation is performed on the block volume 124a connected to the DB 123a, and the data is stored. In the following description, the program stored in the DB server 123 is referred to as the RDBMS 302, but is not necessarily an RDBMS, and may be software for another database such as a NoSQL database.

The block storage 124 stores a backup processing program 303. When executed by the CPU 202 of the block storage 124, the backup processing program 303 performs a backup by, for example, acquiring the snapshot 124b of the block volume 124a, and copying the snapshot 124b to the block volume 133a of the block storage 133 in the cloud environment 130. After the snapshot 124b of the block volume 124a is acquired, the snapshot 124b may be converted into an object by using a function of the backup processing program 303, and the object may be backed up to the object storage of the cloud environment 130. In the following description, the backup methods by using the storage function are the aforementioned two methods, but other backup methods may also be used as long as the methods are methods of backing up to the cloud environment 130.

The backup server 131 in the cloud environment 130 stores a backup utility 304. When executed by the backup server 131, the backup utility 304 executes, for example, processing to restore the backup b1 of the cloud environment 130 backed up by the backup server 122 of the on-premises environment 120.

The DB server 132 in the cloud environment 130 stores an RDBMS (Relational Database Management System) 305. When executed by the DB server 132, the RDBMS 305 issues, for example, an IO of data to the DB 132a, and performs an IO operation on the block volume 133a connected to the DB 132a.

The block storage 133 in the cloud environment 130 stores a backup processing program 306. When executed by the block storage 133, the backup processing program 306 acquires, for example, a snapshot of the backup b3 which is a block volume backed up by the block storage 124 of the on-premises environment 120. It is also possible to execute restore processing to the block volume from the object stored in the backup b2 backed up by the block storage 124 of the on-premises environment 120.

Figure 4:
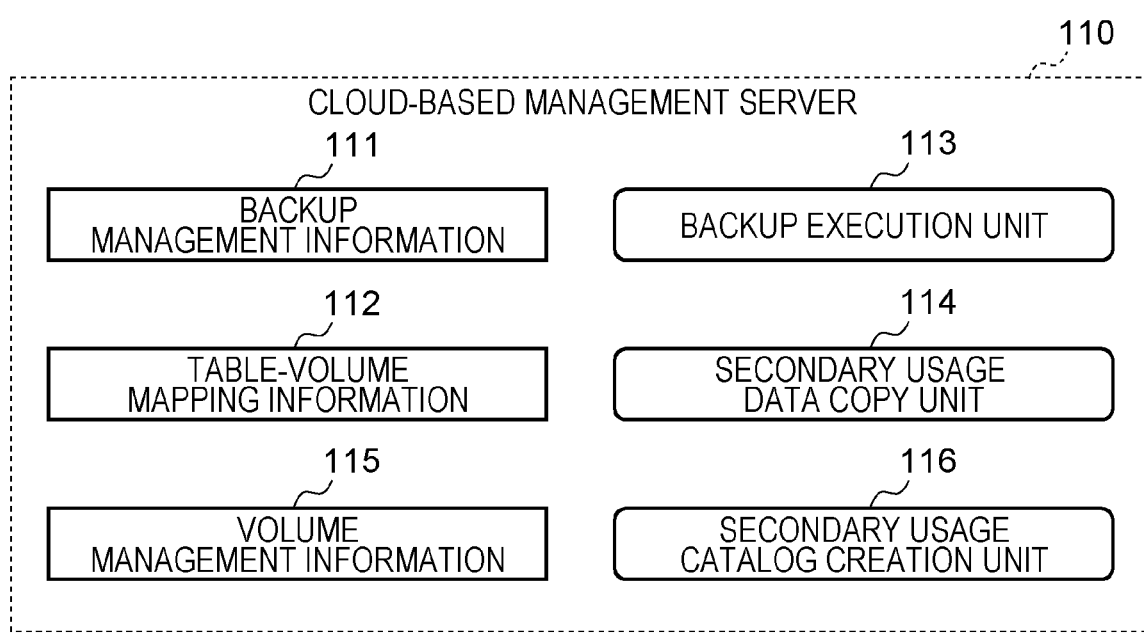
FIG. 4 is a diagram illustrating information and programs held on a cloud-based management server according to the first embodiment.

FIG. 4 is a diagram illustrating information and programs held on the cloud-based management server 110. The cloud-based management server 110 stores backup management information 111, table-volume mapping information 112, volume management information 115, a backup execution unit 113, a secondary usage data copy unit 114, and a secondary usage catalog creation unit 116.

The backup management information 111 is a table that manages information relating to backups of the configuration block storage 124 and 133 and the DB servers 123 and 132 in the on-premises environment 120 and the cloud environment 130. Details of the backup management information 111 will be described below with reference to FIG. 7 illustrating a specific example.

The table-volume mapping information 112 is a table that manages, for example, a relationship between a DB table included in the DB 123a on the DB server 123 of the on-premises environment 120 and the volume 124a in the block storage 124 in which information of the DB 123a is stored. Details of the table-volume mapping information 112 will be described below with reference to FIG. 5 in which a specific example is shown.

The volume management information 115 is a table that manages information relating to block volumes stored in the block storage 124 and 133 configured in the on-premises environment 120 and the cloud environment 130. Details of the volume management information 115 will be described below with reference to FIG. 6 in which a specific example is shown.

The backup execution unit 113 is a program that communicates with the block storage 124 of the on-premises environment 120, the backup server 122, and the block storage 133 in the cloud environment 130, instructs the block storage 124 to perform backups, instructs the backup server 122 to perform backups, and stores information relating to the backups in the backup management information 111 as a result of processing.

The secondary usage catalog creation unit 116 is a program that communicates with the data management server 121 of the on-premises environment 120 and that creates a secondary usage data catalog by using the DB table-volume mapping information 112, the volume management information 115, and the backup management information 111. The secondary usage data catalog indicates target candidates for secondary usage requests. By presenting this secondary usage data catalog, the user is able to select which data is for secondary usage and make usage requests. That is, the secondary usage catalog creation unit 116 functions as a candidate presentation unit that presents data that is a target candidate for a usage request. Details of the secondary usage data catalog creation processing will be described below in FIG. 8 with reference to a specific example of a flowchart.

The secondary usage data copy unit 114 is a program for restoring backup data to the DB server 132 and the block storage 133 in the cloud environment 130 according to items of a secondary usage catalog 1000 which are selected by the user. That is, the secondary usage data copy unit 114 functions as a secondary usage processing unit that receives and processes a usage request for the backup data.

FIG. 5 is a diagram illustrating an example of the DB table-volume mapping information 112. As illustrated in FIG. 5, the DB table-volume mapping information 112 manages a DB table 501, which is a value for identifying a DB table included in the DB server 123 of the on-premises environment 120, a DB ID 502, which is a value for identifying a DB in which the DB table is stored, a volume ID 503, which is a value for identifying a storage volume in which the DB table is stored, and a storage ID 504, which is a value for identifying storage in which the storage volume is stored. The request for secondary usage is made by designating a table. By referring to the DB table-volume mapping information 112, in a case where a table is designated, it is possible to determine which volume in which storage is to be copied.

FIG. 6 is a diagram illustrating an example of the volume management information 115. As illustrated in FIG. 6, the volume management information 115 manages a volume ID 601, which is a value for identifying a volume stored in the block storage 124 of the on-premises environment 120, a backup ID 602, which is a value for identifying a backup stored to the cloud environment 130 as a backup of a volume stored in the block storage 124 of the on-premises environment 120, a volume size 603, which is a value for identifying the capacity of a volume stored in the block storage 124 of the on-premises environment 120, and a storage ID 604, which is a value for identifying storage in which the volume is stored. By referring to the volume management information 115, it is possible to check whether a backup of the volume to be copied exists.

FIG. 7 is a diagram illustrating an example of the backup management information 111. As illustrated in FIG. 7, the backup management information 111 manages a backup ID 701, which is a value for identifying a backup stored in the cloud environment 130, a backup method 702, which is a value for identifying the method with which the backup stored in the cloud environment 130 was acquired, a source volume ID 703, which is a value for identifying a volume from which the backup was acquired, a source storage ID 704, which is a value for identifying storage in which the volume from which the backup was acquired is stored, and a last update date and time 705, which is a value for identifying the last time the backup was acquired. Here, the backup method 702 need not be limited to the method in FIG. 7 (backup to object storage using storage function, backup using backup software, copy to block volume using storage function), and may hold information on another backup method. By referring to the backup management information 111, the backup method can be specified in a case where a backup of the volume to be copied exists.

Figure 8:
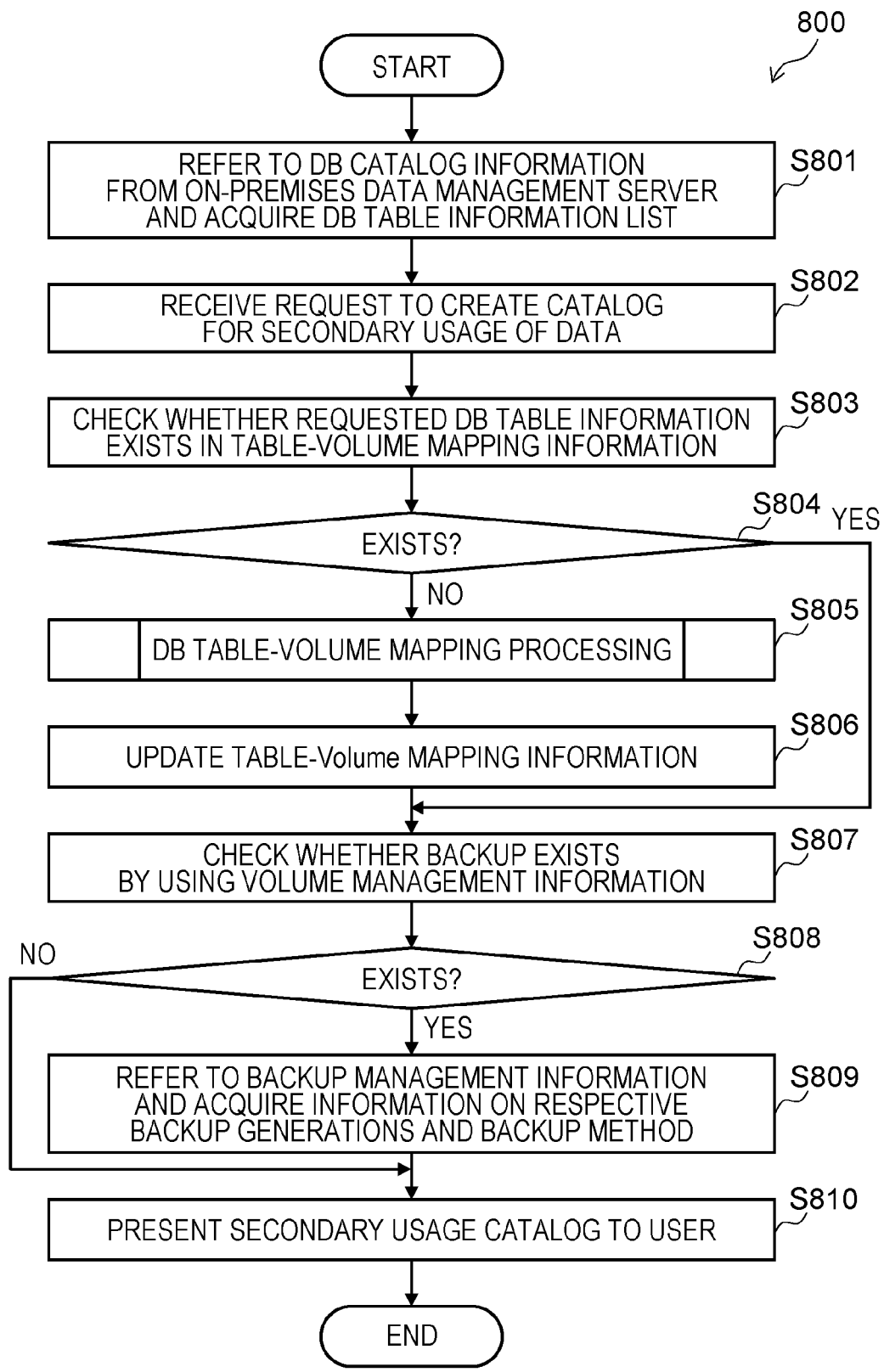
FIG. 8 is a diagram illustrating a flowchart of secondary usage service catalog creation processing according to the first embodiment.

FIG. 8 is a diagram illustrating a flowchart of secondary usage catalog creation processing 800 according to the first embodiment.

According to FIG. 8, first, the secondary usage catalog creation unit 116 refers to the catalog information of the DB stored in the data management server 121 of the on-premises environment 120 and acquires a list of DB table information (step S801).

Next, the secondary usage catalog creation unit 116 presents DB catalog information including a list of DB tables to the user, and receives a request to create a catalog for the secondary usage of data from the user (step S802).

Next, the secondary usage catalog creation unit 116 refers to the DB table-volume mapping information 112, and checks whether or not a DB table selected by the user already exists in the DB table-volume mapping information 112 (step S803). Here, in a case where the DB table selected by the user already exists in the DB table-volume mapping information 112, the processing advances to step S807 (step S804). On the other hand, in a case where the DB table selected by the user does not exist in the DB table-volume mapping information 112, in order to acquire information relating to the DB table selected by the user and the volume in which the DB table is stored and register the information in the DB table-volume mapping information 112, the processing advances to step S805 (step S804).

In step S805, the secondary usage catalog creation unit 116 executes DB table-volume mapping processing to acquire information relating to the DB table selected by the user and the storage volume in which the DB table is stored. Details of the DB table-volume mapping processing will be described below with reference to FIG. 9.

In step S806, the secondary usage catalog creation unit 116 updates the DB table-volume mapping information 112 by registering the information relating to the DB table and the volume obtained as a result of step S805 in the DB table-volume mapping information 112.

In step S807, the secondary usage catalog creation unit 116 refers to the volume management information 115 to check whether there is a backup in the storage volume in which the DB table is stored. In a case where a backup exists in the storage volume in which the DB table is stored, the processing advances to step S809 (step S808). On the other hand, when there is no backup in the storage volume in which the DB table is stored, the processing advances to step S810 (step S808).

In step S809, the secondary usage catalog creation unit 116 refers to the backup management information 111 to acquire, for the backup checked in step S807, information on each backup generation (the last update date and time 705) and the backup method 702.

In step S810, the secondary usage catalog creation unit 116 presents the secondary usage catalog to the user by using the information on the storage volume in which the DB table is stored and the storage volume backup. A specific example of the secondary usage catalog will be described below with reference to FIG. 10.

Figure 9:
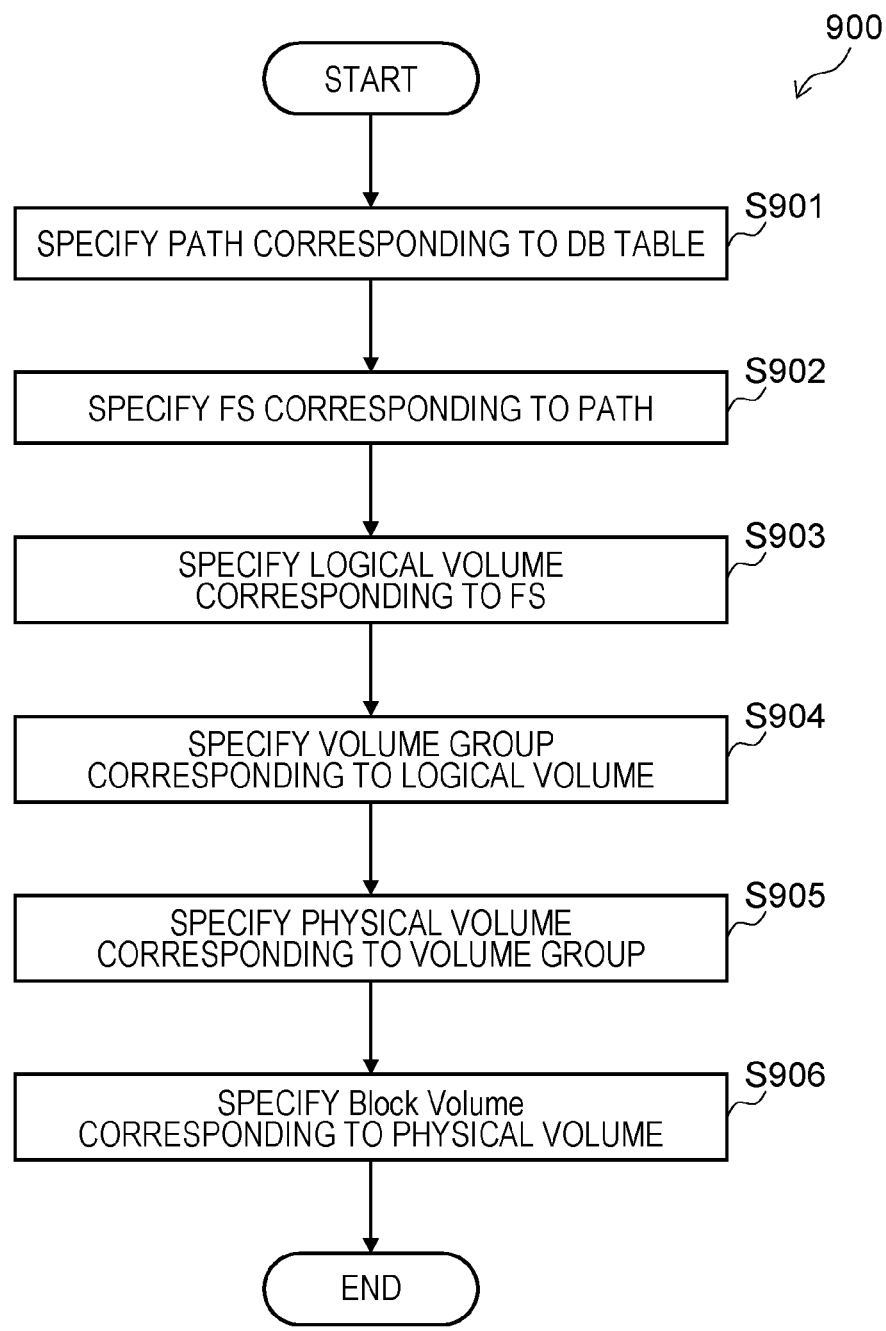
FIG. 9 is a diagram illustrating a flowchart of DB table-block volume mapping processing according to the first embodiment.

FIG. 9 is a diagram illustrating a flowchart of DB table-volume mapping processing 900.

In step S901, the secondary usage catalog creation unit 116 executes processing to specify a path corresponding to the DB table.

In step S902, the secondary usage catalog creation unit 116 executes processing to specify an FS (file system) corresponding to the path. In step S903, the secondary usage catalog creation unit 116 executes processing to specify a logical volume corresponding to the FS.

In step S904, the secondary usage catalog creation unit 116 executes processing to specify a volume group corresponding to the logical volume.

In step S905, the secondary usage catalog creation unit 116 executes processing to specify a physical volume corresponding to the volume group.

In step S906, the secondary usage catalog creation unit 116 executes processing to specify correspondence of a block volume corresponding to the physical volume.

FIG. 10 is a diagram illustrating an example of a secondary usage catalog selection screen.

The secondary usage catalog 1000 is a selection screen that is created by the cloud-based management server 110 on the basis of the DB table-volume mapping information 112, the backup management information 111, and the volume management information 115 and that is displayed on the cloud-based management server. The secondary usage catalog 1000 includes an input field 1001 for inputting a search condition and an input field 1002 for selecting data for secondary usage.

A search condition can be arbitrarily inputted to the input field 1001.

The input field 1002 for selecting data for secondary usage displays a table name 1003, which is information for identifying a DB table name of a secondary usage target acquired in the secondary usage catalog creation processing 800, a DB name 1004 for identifying a DB in which the DB table is stored, a storage ID 1005 for identifying a storage device in which data of the DB is stored, a data location 1006 for identifying information on a site in which the storage in which the data of the DB is stored exists, and a last update date 1007 for identifying the generation of the data.

The user is able to select, from the input field 1002, and display at least one piece of data.

A confirm button 1008 is a button for receiving an instruction to transmit the information inputted to the input field 1002 to the secondary usage data copy unit 114. When the confirm button 1008 is pressed, the secondary usage data copy unit 114 of the cloud-based management server 110 starts copy processing based on the information of 1003 to 1007. Details of the copy processing will be described below in FIG. 11 with reference to a specific example.

Figure 11:
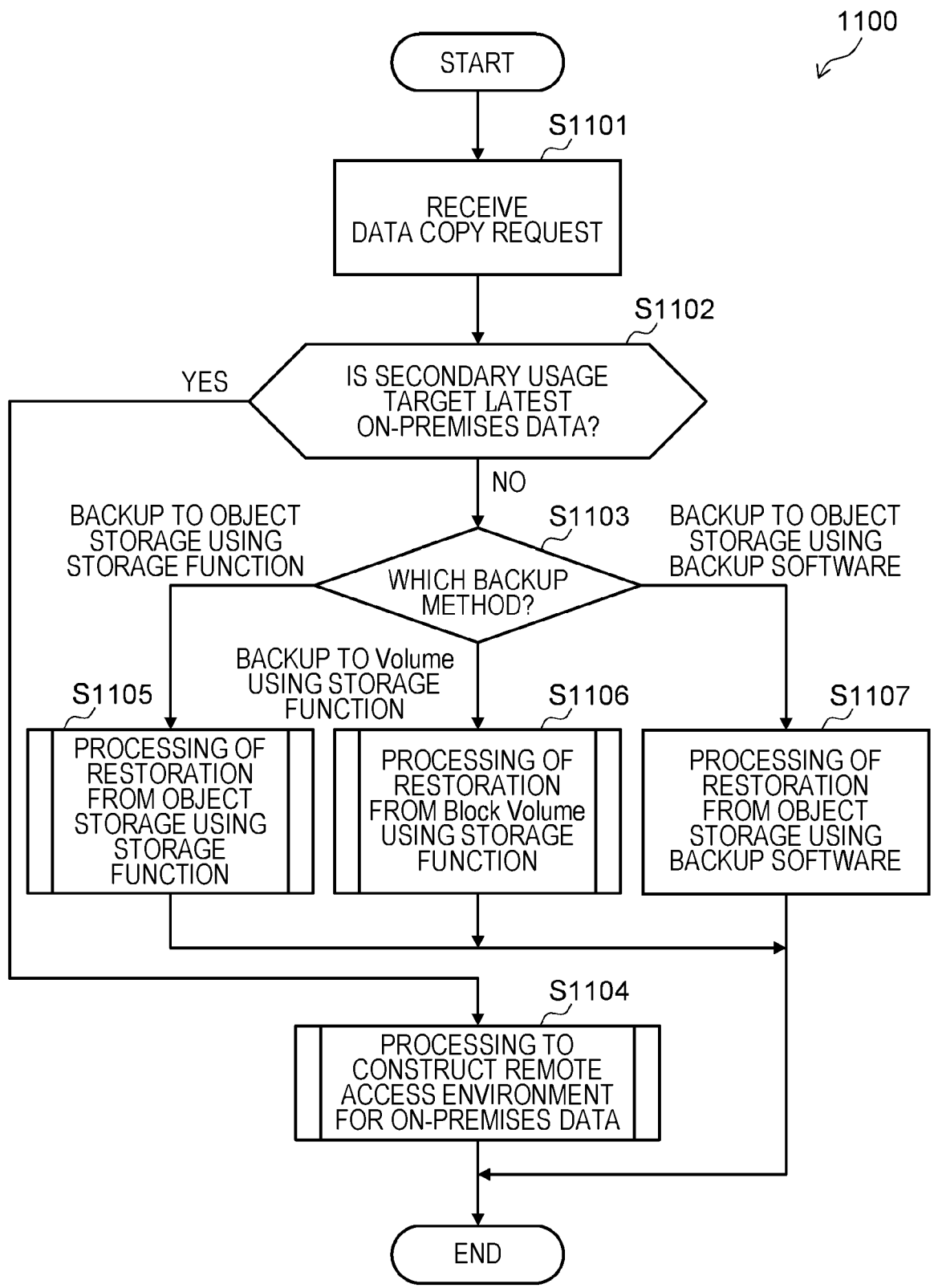
FIG. 11 is a diagram illustrating a flowchart of secondary usage service execution processing according to the first embodiment.

FIG. 11 is a diagram illustrating a flowchart of secondary usage service execution processing 1100.

According to FIG. 11, the secondary usage data copy unit 114 first receives a data copy request which the user inputs upon referring to the secondary usage catalog 1000 (step S1101). Here, the secondary usage catalog 1000 is information created by the secondary usage catalog creation processing 800.

Next, in step S1102, the secondary usage data copy unit 114 refers to the selected information of the secondary usage catalog 1000 and checks whether the secondary usage target is the latest on-premises data. For example, in the secondary usage catalog 1000, in a case where the value of the location 1006 of the data of the row inputted to the input field 1002 is onpremimse.siteX, it is possible to determine that the data copy source is the on-premises environment 120, and hence it can be determined that the data is the latest data and therefore the processing advances to step S1104. On the other hand, for example, in the secondary usage catalog 1000, in a case where the value of the data location 1006 of the row inputted to the input field 1002 is cloud.y, bucket://Z, it is possible to determine that the data copy source is the cloud environment 130, and hence it can be determined that the data copy source is the backup data and therefore the processing advances to step S1103.

In step S1104, the secondary usage data copy unit 114 performs processing to construct an environment in which remote access from the cloud environment 130 is performed on the data of the on-premises environment 120. Details of the processing to construct an environment in which remote access is performed from the cloud environment 130 on the data in the on-premises environment 120 will be described below with reference to FIG. 12.

In step S1103, the secondary usage data copy unit 114 refers to the selected information of the secondary usage catalog 1000 and the backup management information 111, checks the information on the backup method with which the backup of the secondary usage target was acquired, and determines the next step on the basis of the result. For example, in a case where the data storage location 1006 of the selected row for which there is an input to the input field 1002 in the secondary usage catalog 1000 is bucket://Z, it is possible to check that the data has been backed up to the object storage in the cloud environment 130 by using the storage function by searching the backup management information 111 for the row in which the backup ID is bucket://Z and referring to the information of the backup method 702 of the corresponding row, and an advance to step S1105 can be confirmed. Similarly, in a case where the data storage location 1006 of the selected row for which there is an input to the input field 1002 in the secondary usage catalog 1000 is cloud.y Volume #4 and the storage ID 1005 is Storage_1, by searching the backup management information 111 for the row in which the backup ID 701 is volume #4 and the source storage ID 704 is Storage_1 and checking the value of the backup method 702, it can be determined that the volume is being copied to the block storage 133 in the cloud environment 130 by using the storage function, and an advance to step S1106 can be confirmed. Similarly, in a case where the data storage location 1006 of the selected row for which there is an input to the input field 1002 in the secondary usage catalog 1000 is bucket://y, by searching the backup management information 111 for the row in which the backup ID 701 is bucket://y and checking the backup method 702, it can be determined that the data has been backed up to the object storage in the cloud environment 130 by using the function of the backup software, and an advance to step S1107 can be determined.

In step S1105, restore processing, to the block storage 133, of the data backed up to the object storage in the cloud environment 130 by using the storage function is performed. Details of the restore processing, to the block storage 133, of the data backed up to the object storage in the cloud environment 130 by using the storage function will be described below with reference to FIG. 13.

In step S1106, restore processing, to the block volume 133*a*, of data backed up to a block volume b3 of the block storage 133 in the cloud environment 130 by using the storage function is performed. Details of the restore processing, to the block volume 133*a*, of the data backed up to the block volume b3 of the block storage 133 in the cloud environment 130 by using the storage function will be described below with reference to FIG. 14.

In step S1107, the restore processing of the data backed up to the object storage in the cloud environment 130 to the cloud environment 130 is performed by the backup software. This processing is processing to restore the backup b1, which was backed up in the object storage of the cloud environment 130 by the backup server 123 in the on-premises environment 120, to the cloud environment 130. The backup b1 is backed up to the cloud environment by the backup utility 301 included in the backup server 122 which is on premises. Therefore, in order to restore the backup b1 to the cloud environment 130, the backup server 131, which has the backup utility 304 with the function to restore backups by using the backup utility 301, is required in the cloud environment 130. Here, the DB server and the block volume are restored from the backup in the cloud environment 130 by using the function of the backup server 131 in the cloud environment 130.

Figure 12:
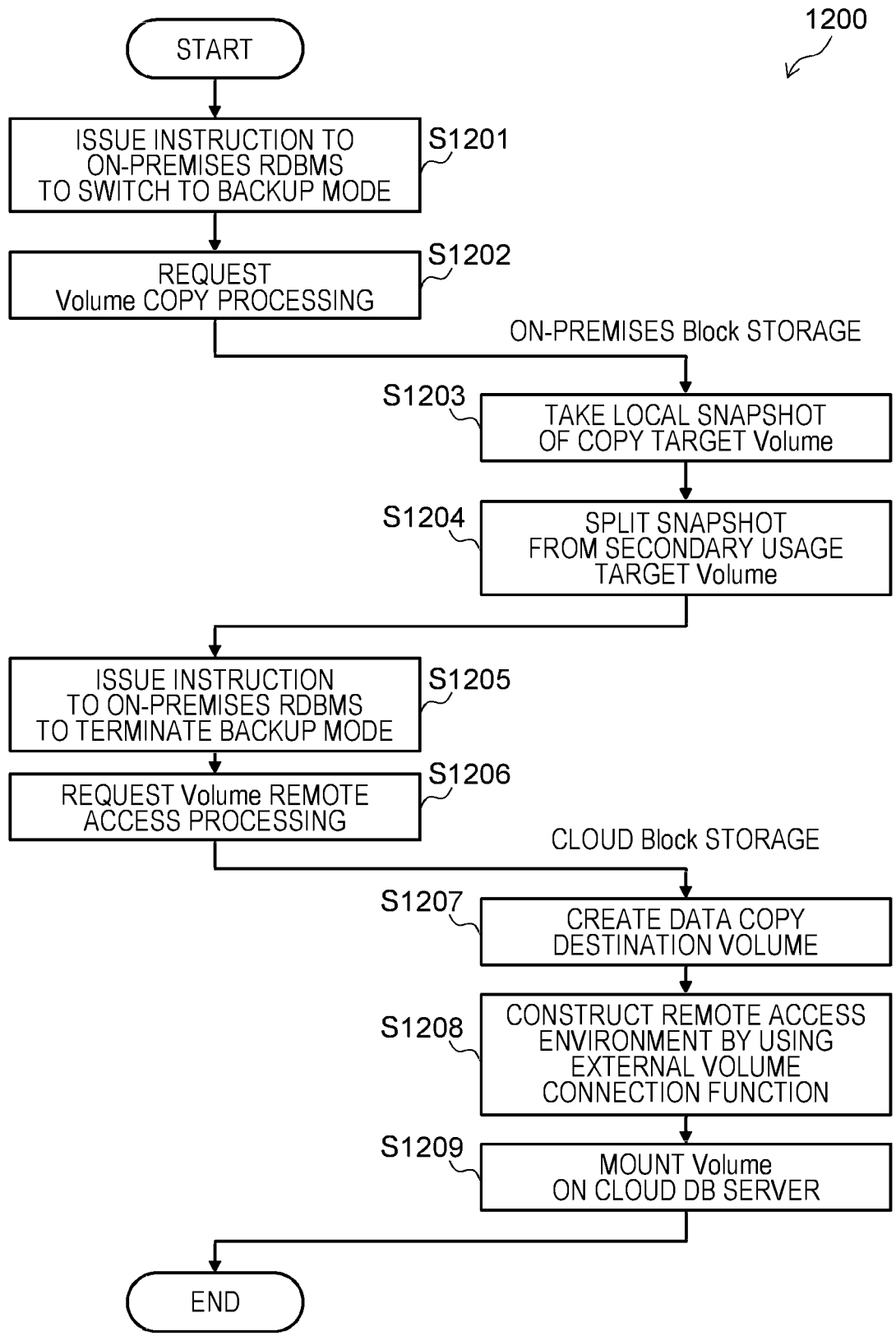
FIG. 12 is a diagram illustrating a flowchart of processing to construct a secondary usage environment by remotely accessing on-premises data from the cloud according to the first embodiment.

FIG. 12 is a diagram illustrating a flowchart of processing 1200 to construct an environment in which remote access is performed from the cloud environment 130 on data in the on-premises environment 120.

In step S1201, the secondary usage data copy unit 114 instructs the RDBMS 302 of the DB server 123 in the on-premises environment 120 to switch to a backup mode.

In step S1202, the secondary usage data copy unit 114 issues a request to the block storage 124 in the on-premises environment 120 to perform copy processing of the volume 124*a* constituting the secondary usage target. Here, the copy processing instruction to the block storage 124 of the on-premises environment 120 refers to steps S1203 and S1204.

In step S1203, the block storage 124 of the on-premises environment 120 takes the snapshot 124*b* of the copy target volume 124*a*.

In step S1204, the block storage 124 of the on-premises environment 120 splits the snapshot 124*b* from the target volume 124*a*. Here, the splitting of the snapshot 124*b* from the target volume 124*a* signifies split processing to prevent a write operation to the snapshot 124*b* from overwriting the data of the volume 124*a* when the splitting is complete.

In step S1205, the secondary usage data copy unit 114 issues an instruction to the on-premises RDBMS 302 to terminate the backup mode.

In step 1206, the secondary usage data copy unit 114 issues a request to the block storage 133 in the cloud environment 130 to perform remote access processing with respect to a block volume 124*b* of the on-premises environment 120. Here, the remote access processing refers to steps S1207, S1208, and S1209.

In step S1207, the block storage 133 in the cloud environment 130 creates a volume having the same capacity as the volume capacity of the volume 124*b* of the on-premises environment 120 in order to construct an environment for realizing remote access. Here, information on the volume capacity is included in the remote access processing request in step S1206, and the secondary usage data copy unit 114 refers to the volume management information 115 and uses the value disclosed under volume size 603 in the row in which the volume is assigned the volume ID 601.

In step 1208, the block storage 133 in the cloud environment 130 constructs a remote access environment by using an external volume connection function to connect, as an external volume, the volume 124*b* of the on-premises environment to the volume created in step 1207.

In step S1209, the volume in the block storage 133 created in step S1207 is mounted from the DB server 132 in the cloud environment 130 so as to make the data available for secondary usage.

As described above, in a case where data targeted for secondary usage is not backed up in the cloud environment 130, a snapshot of the data in the on-premises environment 120 is created, and an environment enabling remote access is constructed. In this case, network communication between the on-premises environment and cloud environment is limited to a relatively low load. This is because a portion of the volume is selectively transmitted. Note that the snapshot created in step S1203 can be deleted after use.

Figure 13:
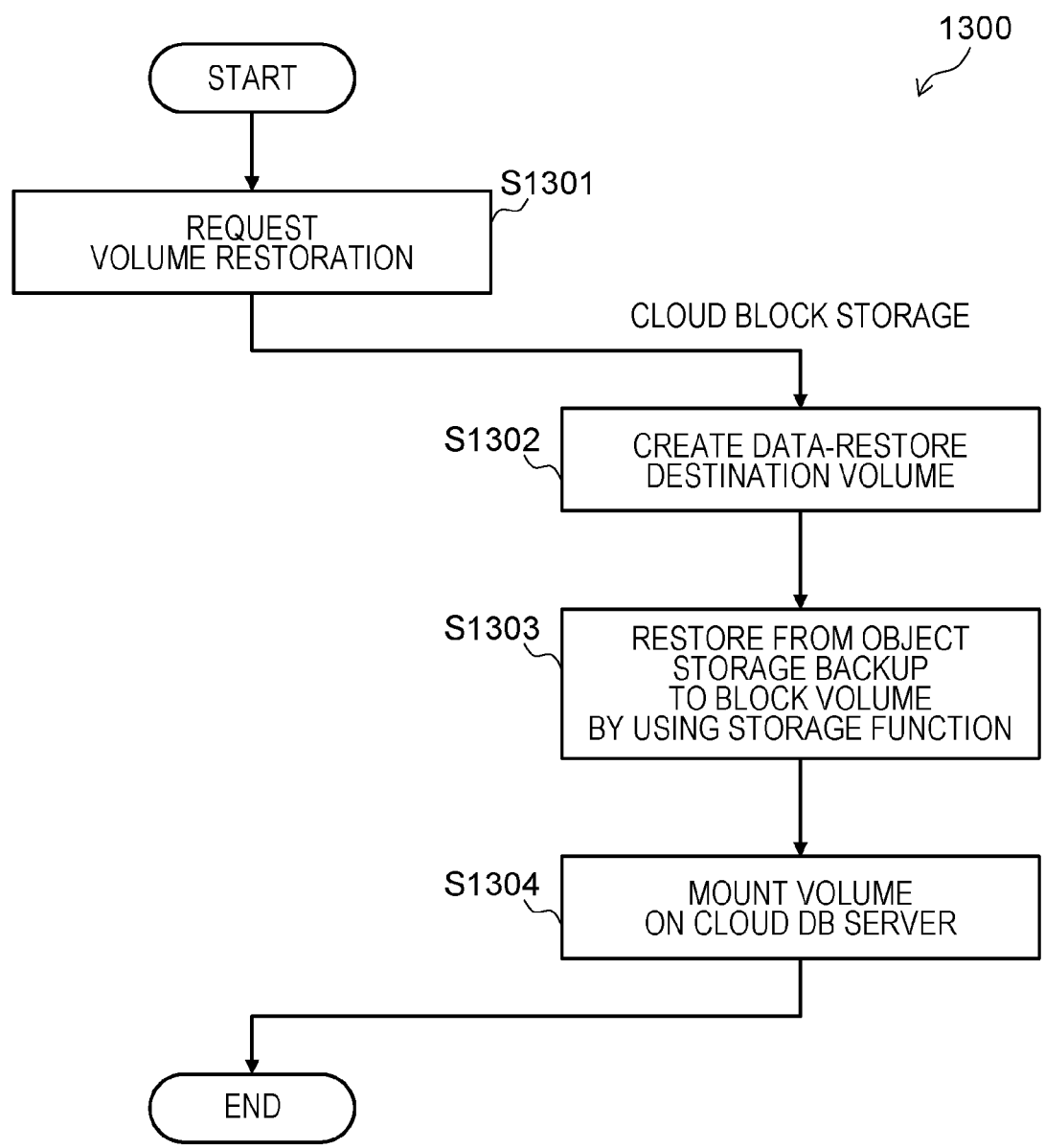
FIG. 13 is a diagram illustrating a flowchart for performing restore processing from a backup stored in cloud-environment object storage to a cloud computing infrastructure by using the storage function according to the first embodiment.

FIG. 13 is a diagram illustrating a flowchart 1300 in which the storage function is used to perform restore processing on a backup stored in the object storage of the cloud environment 130 to a volume of the block storage 133 in the cloud environment 130.

In step S1301, the secondary usage data copy unit 114 issues a request to the block storage 133 in the cloud environment 130 to restore the backup b2.

In step S1302, the block storage 133 in the cloud environment 130 creates a volume having the same capacity as the volume capacity of the volume 124b of the on-premises environment 120 as a restore destination of the data of the backup b1. Here, information on the volume capacity is included in the request for the volume restore processing in step S1301, and the secondary usage data copy unit 114 refers to the volume management information 115 and uses the value described under the volume size 603 in the row in which the volume is assigned the volume ID 601.

In step S1303, the block storage 133 uses the backup processing program 306 to perform a restore from the backup b2 of the object storage to the volume created in step S1302.

In step S1304, the volume in the block storage 133 to which the data has been copied by the restore processing in step S1303 is mounted from the DB server 132 in the cloud environment 130 so as to make the data available for secondary usage.

Figure 14:
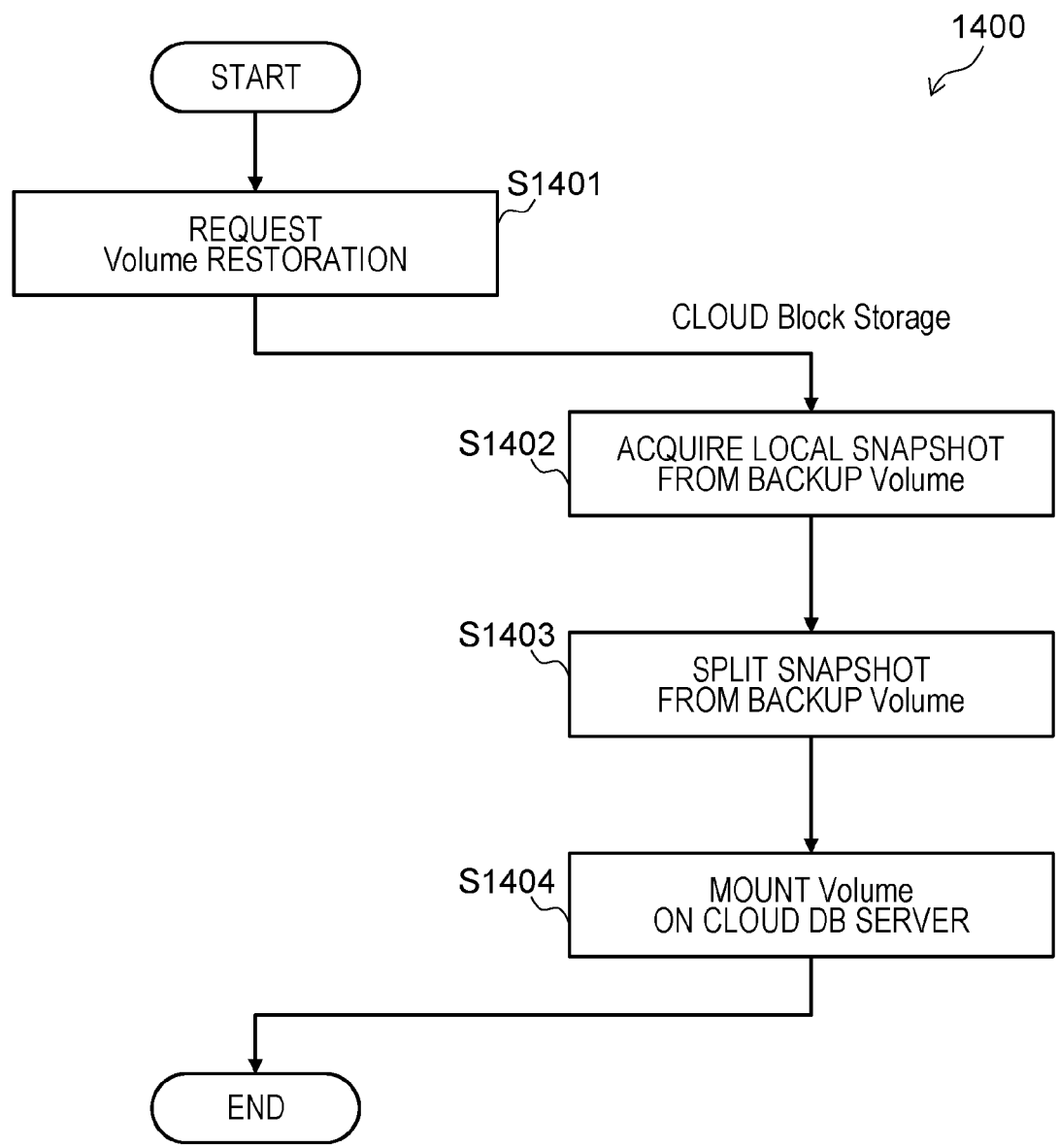
FIG. 14 is a diagram illustrating a flowchart for performing restore processing from a backup stored in a block volume of a cloud environment to a cloud computing infrastructure by using the storage function according to the first embodiment.

FIG. 14 is a diagram illustrating a flowchart 1400 for performing restore processing from another volume in the block storage 133 with respect to a backup copied to the block storage 133 in the cloud environment 130 by using the storage function.

In step S1401, the secondary usage data copy unit 114 issues a request to the block storage 133 in the cloud environment 130 to restore the backup b3.

In step S1402, the block storage 133 in the cloud environment 130 acquires a snapshot from the backup b3, which is a volume for performing a backup, to the cloud environment 130, of the block volume 124a of the block storage 124 in the on-premises environment 120.

In step S1403, the snapshot obtained in step S1402 is split from the backup b3.

In step S1404, the snapshot acquired in step S1403 is mounted from the DB server 132 in the cloud environment 130 so as to make the data available for secondary usage.

As described above, the disclosed data management system is a data management system for backing up data in a first environment to a second environment, the data management system including:

backup management information 111 in which source data, backup data, and a backup method are associated; and a secondary usage data copy unit 114 serving as a secondary usage processing unit that receives a usage request for the backup data stored in the second environment, wherein the secondary usage processing unit refers to the backup management information, specifies the backup data required for processing the usage request, specifies the backup method for the backup data, restores the backup data on the basis of the specified backup method, and enables processing of the usage request.

As an example, the first environment is an on-premises environment, the second environment is a cloud environment, and the first environment stores the data in block storage.

With this configuration, data backed up by various methods can be easily and effectively used in a hybrid cloud environment.

The disclosed data management system further includes a secondary usage catalog creation unit 116 serving as a candidate presentation unit that presents data constituting target candidates for the usage request, wherein the secondary usage processing unit receives a user selection from among the target candidates, and in a case where backup data of the selected data exists in the second environment, restores the backup data in the second environment and processes the usage request.

The disclosed data management system further includes a secondary usage catalog creation unit 116 serving as a candidate presentation unit that presents data constituting target candidates for the usage request, wherein the secondary usage processing unit receives a user selection from among the target candidates, and in a case where backup data of the selected data does not exist in the second environment, performs remote access processing on the data of the first environment.

At this time, the secondary usage processing unit constructs a remote access environment by generating a snapshot of data in the first environment and mapping the generated snapshot to a volume in the second environment.

As described above, with the disclosed system, if there is backup data in the second environment, the backup data is restored and undergoes secondary usage, and if there is no backup data in the second environment, a snapshot of data in the first environment is generated and remote access is performed. Therefore, data usage from the second environment is possible regardless of whether a backup has been made.

Note that the present invention is not limited to or by the above-described embodiments, and includes various modifications. For example, the above-described embodiments have been described in detail to facilitate understanding of the present invention, and the present invention is not necessarily limited to or by embodiments having all the configurations described. In addition, modifications are not limited to those from which such configurations have been removed, rather, configurations can also be replaced or added.

For example, in the foregoing embodiments, a case was illustrated in which data in an on-premises environment is backed up to a cloud environment, but a configuration in which the data in the on-premises environment is backed up to another on-premises environment is also conceivable.

What is claimed is:

1. A data management system for backing up data of a first environment to a second environment, the data management system comprising:
a memory; and
one or more processors that are communicatively coupled to the memory, wherein the one or more processors are collectively configured to:

obtain backup management information in which source data, backup data, and a backup method are associated, receive a usage request for the backup data stored in the second environment, present a catalog indicating target candidates for the usage request, and refer to the backup management information, specify backup data required for processing the usage request, specify a backup method for the backup data, restore the backup data on the basis of the specified backup method, and enable processing of the usage request.

2. The data management system according to claim 1, wherein the first environment is an on-premises environment, the second environment is a cloud environment, and the first environment stores the data in block storage.

3. The data management system according to claim 1, wherein the one or more processors are further configured to:

receive a user selection from among the target candidates, and in a case where backup data of the selected data exists in the second environment, restore the backup data in the second environment and process the usage request.

4. The data management system according to claim 1, wherein the one or more processors are further configured to:

receive a user selection from among the target candidates, and in a case where backup data of the selected data does not exist in the second environment, perform remote access processing on the data of the first environment.

5. The data management system according to claim 4, wherein the one or more processors are further configured to:

construct a remote access environment by generating a snapshot of data in the first environment and map the generated snapshot to a volume in the second environment.

6. A data management method, in which a data management system for backing up data of a first environment to a second environment performs the steps comprising:

generating backup management information by associating source data, backup data, and a backup method;

receiving a usage request for the backup data stored in the second environment;

presenting a catalog indicating target candidates for the usage request; and specifying backup data required for processing the usage request by referring to the backup management information, specifying a backup method for the backup data, restoring the backup data on the basis of the specified backup method, and enabling processing of the usage request.

* * * * *